United States Patent [19]

Asfour

[11] Patent Number: 4,915,321

[45] Date of Patent: Apr. 10, 1990

[54] RETRACTOR WITH CINCH MECHANISM

[75] Inventor: Richard E. Asfour, New Baltimore, Mich.

[73] Assignee: TRW Vehicle Safety Systems Inc., Lyndhurst, Ohio

[21] Appl. No.: 246,629

[22] Filed: Sep. 20, 1988

[51] Int. Cl.$^4$ .................. B65H 75/48; A62B 35/02
[52] U.S. Cl. ................... 242/107.4 A; 242/107.4 R
[58] Field of Search .................. 242/107.4 R, 107.4 B, 242/107.4 A; 280/806; 297/478, 480

[56] References Cited

U.S. PATENT DOCUMENTS

| | | | |
|---|---|---|---|
| 4,135,682 | 1/1979 | Mizuno | 242/107.4 B |
| 4,429,841 | 2/1984 | Kassai | 242/107.4 B |
| 4,436,255 | 3/1984 | Matsui et al. | 242/107.4 A |
| 4,518,132 | 5/1985 | Schmidt | 242/107.4 A |
| 4,564,154 | 1/1986 | Takada | 242/107.4 B |
| 4,566,649 | 1/1986 | Peterson III | 242/107.4 A |
| 4,726,539 | 2/1988 | Schmidt | 242/107.4 A |
| 4,749,142 | 6/1988 | Saitou | 242/107.4 B |

FOREIGN PATENT DOCUMENTS

2817214 10/1979 Fed. Rep. of Germany ... 242/107.4 B
2131279  6/1984 United Kingdom ......... 242/107.4 B

Primary Examiner—Katherine A. Matecki
Attorney, Agent, or Firm—Tarolli, Sundheim & Covell

[57] ABSTRACT

A spindle has belt webbing wound thereon. The spindle is supported for rotation in belt withdrawal and belt retraction directions. A pawl member is movable from a first position allowing rotation of the spindle to a second position blocking rotation of the spindle in belt withdrawal direction. An inertia member is supported for rotation with and relative to the spindle. The pawl member is moved to its second position in response to rotation of the spindle in the belt withdrawal direction relative to the inertia member. Rotation of the inertia member is blocked in response to rotation of the spindle in the belt withdrawal direction a predetermined amount to enable the spindle to rotate in the belt withdrawal direction relative to the inertia member and thereby effect movement of the pawl member to its second position.

11 Claims, 5 Drawing Sheets

RETRACTOR WITH CINCH MECHANISM

BACKGROUND OF THE INVENTION

1. Field of the Invention

The present invention relates to a seat belt retractor for use in a vehicle. In particular, the present invention relates to a seat belt retractor having a mechanism which, in response to a predetermined amount of seat belt webbing withdrawal, moves a member to a position in which further withdrawal of the seat belt webbing is blocked.

2. Description of the Prior Art

Seat belt retractors having a mechanism which, in response to a predetermined amount of seat belt webbing withdrawal, moves a member to a position blocking further withdrawal of seat belt webbing from the retractor are known. Such a mechanism is referred to as a "cinch mechanism". A seat belt retractor having a cinch mechanism is useful for securing an article, such as a package or a child seat, to a vehicle seat. Although a cinch mechanism is actuated to block withdrawal of seat belt webbing from the retractor after a predetermined amount of webbing has been withdrawn, seat belt webbing can still be wound onto the retractor.

U.S. Pat. No. 4,436,255 discloses a vehicle sensitive seat belt retractor having a cinch mechanism. The cinch mechanism includes a cam member which rotates in response to rotation of a belt takeup shaft. When a predetermined amount of seat belt webbing is withdrawn, the cam member rotates to a predetermined position and moves a follower. The follower moves a pawl into engagement with a ratchet wheel connected to the takeup shaft. The pawl then blocks further rotation of the ratchet wheel and takeup shaft in the belt withdrawal direction.

U.S. Pat. No. 4,518,132 also discloses a vehicle sensitive seat belt retractor having a cinch mechanism. Upon withdrawal of the seat belt webbing, a part of the webbing engages and pivots a lever. Pivoting of the lever causes a spring to move a pawl into engagement with a ratchet wheel connected with a spool of the retractor. Further rotation of the spool in the belt withdrawal direction is, thus, blocked but rotation of the spool in a belt retraction direction is permitted.

SUMMARY OF THE INVENTION

The present invention is directed to a seat belt retractor having a cinch mechanism which is actuated in response to a predetermined amount of seat belt webbing being withdrawn from the retractor. After the cinch mechanism is actuated, a slight amount of additional seat belt webbing withdrawal causes further withdrawal of the seat belt webbing from the retractor to be blocked. In emergency situations, the retractor blocks withdrawal of the seat belt webbing in response to withdrawal of the webbing from the retractor at a rate of acceleration above a predetermined rate of acceleration and/or in response to deceleration of the vehicle at a rate above a predetermined rate of deceleration.

The seat belt retractor of the present invention includes a spindle on which the seat belt webbing is wound. The spindle is supported for rotation in belt withdrawal and belt retraction directions. A plurality of teeth extend from a ratchet wheel which is connected to and rotatable with the spindle. A pawl is movable from a first position in which the pawl is disengaged from the ratchet wheel to a second position in which the pawl engages a tooth on the ratchet wheel to block rotation of the spindle in the belt withdrawal direction. The pawl is moved to its second position in response to a predetermined amount of rotation of the spindle in the belt withdrawal direction relative to an inertia member. Rotation of the inertia member lags behind rotation of the spindle when the seat belt webbing is withdrawn from the retractor at a rate of acceleration above a predetermined rate of acceleration.

The cinch mechanism includes an arm which is supported for pivotal movement and which has a portion for engaging one of a plurality of teeth which extend from the inertia member to block rotation of the inertia member. When rotation of the inertia member is blocked by the arm, a slight amount of additional belt webbing withdrawal causes the pawl to move into engagement with the ratchet wheel to block any further belt withdrawal. Pivoting of the arm toward the inertia member to engage one of the plurality of teeth on the inertia member occurs in response to a predetermined amount of rotation in one direction of a rotatable member. Specifically, the rotatable member has a portion for engaging the arm to pivot the arm toward the inertia member when the rotatable member rotates. A plurality of drive teeth extend radially from the rotatable member.

A drive member is connected to and rotatable with the spindle. The drive member engages one of the plurality of drive teeth on the rotatable member to rotate the rotatable member a predetermined arcuate distance during each revolution of the spindle. Preferably, a predetermined number of revolutions of the spindle is necessary to pivot the arm into engagement with the inertia member. A detent limits the amount of rotation that the rotatable member may rotate to a predetermined increment during each revolution of the spindle.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
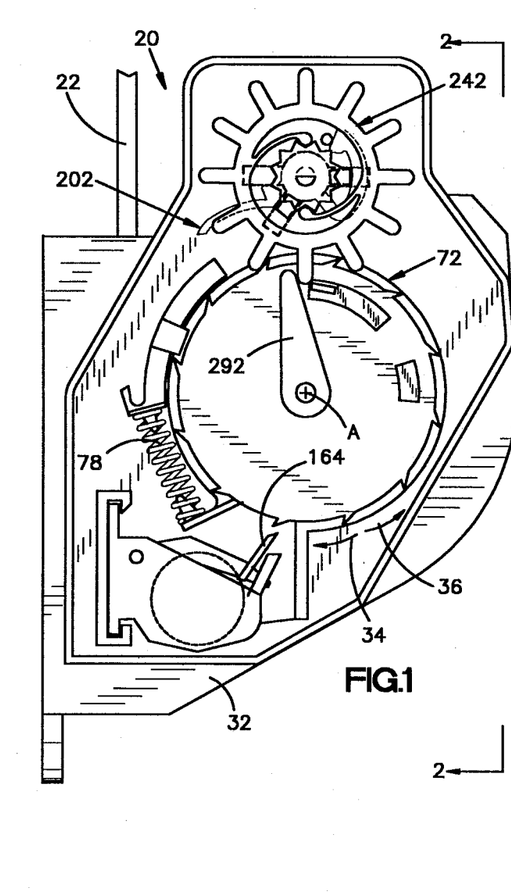
FIG. 1 is a side view of a seat belt retractor embodying the present invention.
Figure 2:
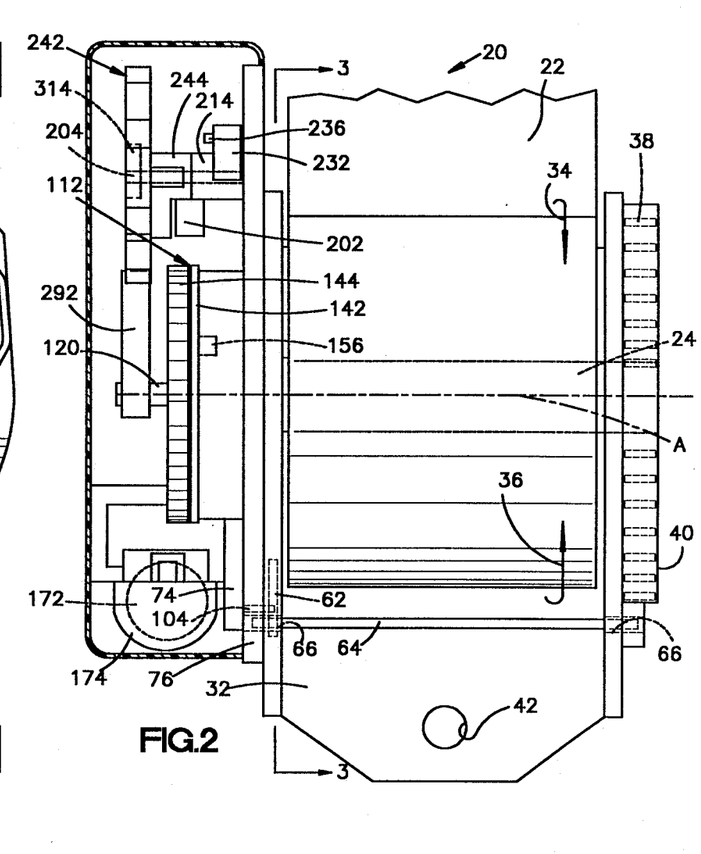
FIG. 2 is a plan view of the retractor of FIG. 1, taken approximately along line 2—2 in FIG. 1.

A seat belt retractor 20 embodying the present invention is illustrated in FIGS. 1 and 2. Seat belt webbing 22 extends from the retractor 20 for restraining movement of a vehicle occupant, as is known. The belt webbing 22 is connected at one end to a spindle 24 (FIG. 2) of the retractor 20. A frame 32 supports the spindle 24 for rotation about its longitudinal central axis A in a belt withdrawal direction 34 and a belt retraction direction 36. A wind-up spring 38 connected between a spring housing 40 and the spindle 24 biases the spindle to rotate in the belt retraction direction 36 to wind the belt webbing 22 on the spindle. A fastener (not shown) extends through an opening 42 in the frame 32 to connect the retractor 20 to the vehicle, as is known.

A ratchet wheel 52 (FIG. 3) is connected to and rotates with the spindle 24. A plurality of ratchet teeth 54 are equally spaced about the outer periphery of the ratchet wheel 52. A pawl 62 is pivotally mounted on a pivot shaft 64 which is supported at both ends in openings 66 in opposite sides of the frame 32. The pawl 62 is pivotable from a position in which an end portion 68 of the pawl is spaced away from the ratchet wheel 52, as illustrated in dashed lines in FIG. 3, to a position in which the end portion 68 engages one of the plurality of teeth 54 on the ratchet wheel 52, as illustrated in solid lines in FIG. 3. When the end portion 68 of the pawl 62 engages a tooth 54 on the ratchet wheel 52, rotation of the ratchet wheel 52 and the spindle 24 in the belt withdrawal direction 34 is blocked.

Figure 4:
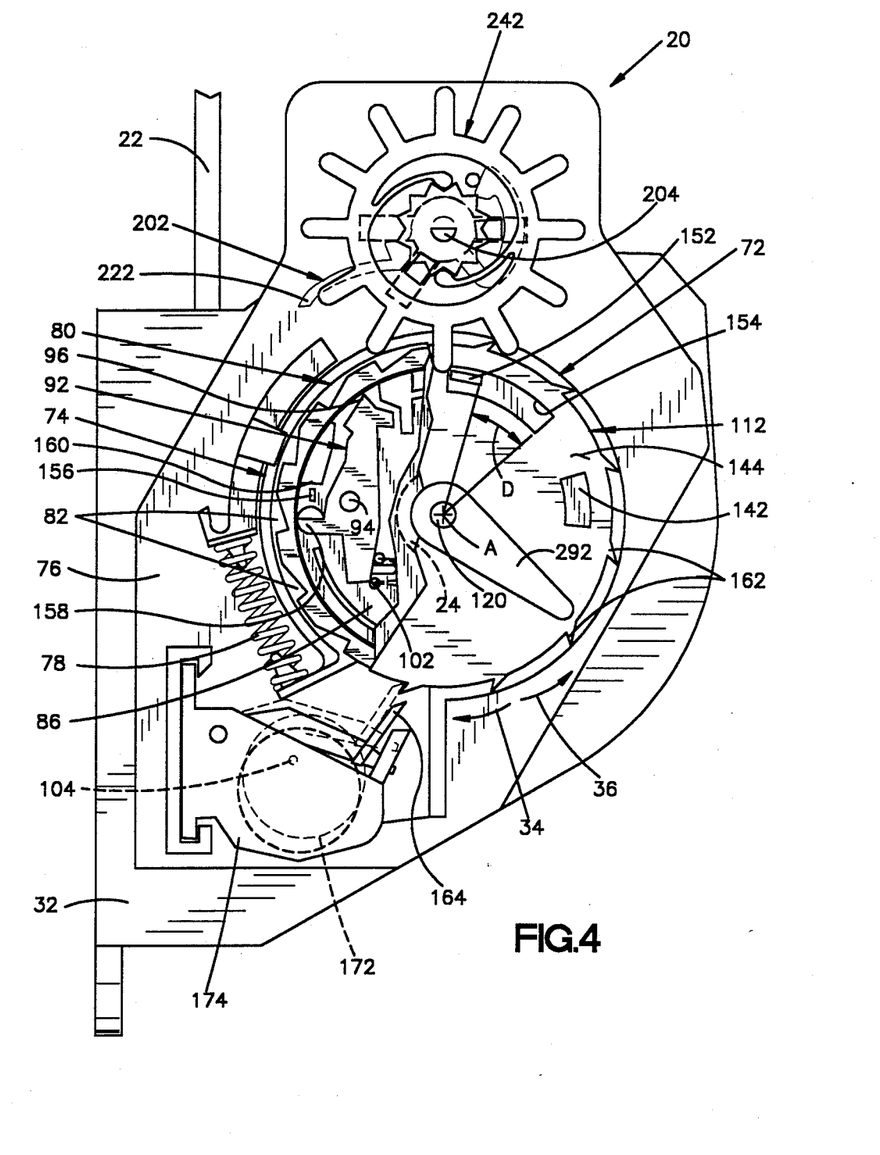
FIG. 4 is an enlarged view similar to FIG. 1, with parts broken away for clarity.

A pilot sensor 72 (FIG. 4) pivots the end portion 68 of the pawl 62 toward the ratchet wheel 52 to engage one of the plurality of teeth 54 in response to the seat belt webbing 22 being withdrawn from the retractor 20 at a rate above a predetermined rate. The pilot sensor 72 also pivots the end portion 68 of the pawl 62 toward the ratchet wheel 52 in response to a relatively small amount of withdrawal of seat belt webbing 22 from the retractor after acceleration or deceleration of the vehicle in any direction at a rate above a predetermined rate.

The pilot sensor 72 includes a base 74 supported by a housing 76 connected to the frame 32. The base 74 is rotatable a slight amount relative to the housing 76. The base 74 is biased to rotate counterclockwise, as viewed in FIG. 4, relative to the housing 76 by a spring 78. An axially extending annular ring portion 80 is connected to the base 74. The annular ring portion 80 of the base 74 extends coaxially relative to the spindle 24. A plurality of teeth 82 are equally spaced about the inner periphery of the annular ring portion 80. A drum 86 is disposed coaxially within the annular ring portion 80 of the base 74. The drum 86 is connected to the spindle 24 for rotation with the spindle and is rotatable relative to the annular ring portion 80 of the base 74.

A pilot pawl 92 is received on a pin 94 extending axially from the drum 86. The pilot pawl 92 is pivotal about the pin 94. The pilot pawl 92 has an end portion 96 for engaging one of the teeth 82 on the annular ring portion 80 of the base 74. The pilot pawl 92 is biased away from engaging the teeth 82 on the annular ring portion 80 by a spring 102. When the pilot pawl 92 pivots so the end portion 96 of the pilot pawl engages one of the teeth 82 on the annular ring portion 80 of the base 74, the drum 86 and the spindle 24 are coupled to the base. When the spindle 24 and base 74 are coupled together, upon rotation of the spindle 24 in the belt withdrawal direction 34, the base 74 rotates in a clockwise direction, as viewed in FIG. 4, relative to the housing 76 against the bias of the spring 78.

A pin 104 (FIGS. 2-4) extends axially from the base 74 in a direction axially opposite the direction in which the annular ring portion 80 extends from the base. The pin 104 is received in a slot 106 (FIG. 3) in the pawl 62. During rotation of the base 74 in the clockwise direction, as viewed in FIG. 4, relative to the housing 76, the pin 104 rotates about the axis A, from the position illustrated in dashed lines in FIG. 3 to the position illustrated in solid lines in FIG. 3. During the clockwise rotation of the pin 104 about the axis A, the pin rides along a surface defining the slot 106 to pivot the pawl 62 about the shaft 64 in a counterclockwise direction, from the position illustrated in dashed lines in FIG. 3, toward the ratchet wheel 52, to the position illustrated in solid line in FIG. 3.

An inertia member 112 (FIGS. 2 and 4) is supported by a shaft 120 connected to and rotatable with the drum 86. The shaft 120 extends coaxially relative to the spindle 24. The inertia member 112 includes a circular metallic inertia disk 142 and a circular plastic clutch disk 144. The clutch disk 144 is rotatable relative to the inertia disk 142 through a relatively small arcuate distance D. The relative rotation is limited by a projection 152 on the inertia disk 142 extending axially into an arcuate slot 154 in the clutch disk 144. The inertia disk 142 is biased by a spring (not shown) which is connected between the inertia disk and clutch disk 144 and exerts a relatively light force to rotate the inertia disk in the counterclockwise direction, as viewed in FIG. 4, relative to the clutch disk. The inertia disk 142 also has a projection 156 (FIGS. 2 and 4) extending axially into a space between an arm 158 (FIG. 4) of the pilot pawl 92 and a drive surface 160 of the drum 86.

The inertia member 112 is rotated by rotation of the spindle 24. When the spindle 24 rotates in the belt retraction direction 36, the projection 156 engages the drive surface 160 of the drum 86 to rotate the inertia disk 142 and, thus, the inertia member 112 in the belt retraction direction 36. When the spindle 24 rotates in the belt withdrawal direction 34, the projection 156 engages the arm 158 of the pilot pawl to rotate the inertia member 112 in the belt withdrawal direction 34.

When the seat belt webbing 22 is withdrawn from the retractor 20 at a rate of acceleration above a predetermined rate, rotation of the inertia disk 142 in the belt withdrawal direction 34 lags behind rotation of the spindle 24 in the belt withdrawal direction. When rotation of the inertia member 76 lags behind rotation of the spindle 24 in the belt withdrawal direction 34, the projection 156 forces the pilot pawl 92 to pivot counterclockwise, as viewed in FIG. 4, so the end portion 96 of the pilot pawl pivots toward the annular ring portion 80 of the base 74. The end portion 96 of the pilot pawl 92 then engages one of the teeth 82 on the annular ring portion 80 of the base 74 to couple the spindle and the base 74 together. Further rotation of the spindle 24 in the belt withdrawal direction 34 rotates the base 74 in the clockwise direction, as viewed in FIG. 4, relative to the housing 76 to pivot the pawl 62 (FIG. 3) toward the ratchet wheel 52.

A plurality of ratchet teeth 162 (FIG. 4) are equally spaced about the outer periphery of the clutch disk 144 of the inertia member 112. A lever arm 164 is pivotable into engagement with one of the teeth 162 to block rotation of the clutch disk 144 and, thus, the inertia member 112. When rotation of the inertia member 112 in the belt withdrawal direction 34 is blocked, any further withdrawal of the belt webbing 22 from the retractor 20 rotates the spindle 24 in the belt withdrawal direction 34 relative to the inertia member 112. This relative rotation causes the projection 156 on the inertia disk 142 to move the end portion 96 of the pilot pawl 92 into engagement with a tooth 82 on the annular ring portion 80 of the base 74. The spindle 24 and base 74 are, thus, coupled together and upon any further withdrawal of the belt webbing 22, the base rotates causing the pawl 62 to pivot toward the ratchet wheel 52, as described above.

The lever arm 164 is pivoted by a spherical mass 172 (FIG. 4) which is supported by a cup 174. The cup 174 is attached to the frame 32. The spherical mass 172 moves within the cup 174 to pivot the lever arm 164 toward the clutch disk 144 in response to the vehicle accelerating or decelerating at a rate above a predetermined rate.

Figures 3, 5:
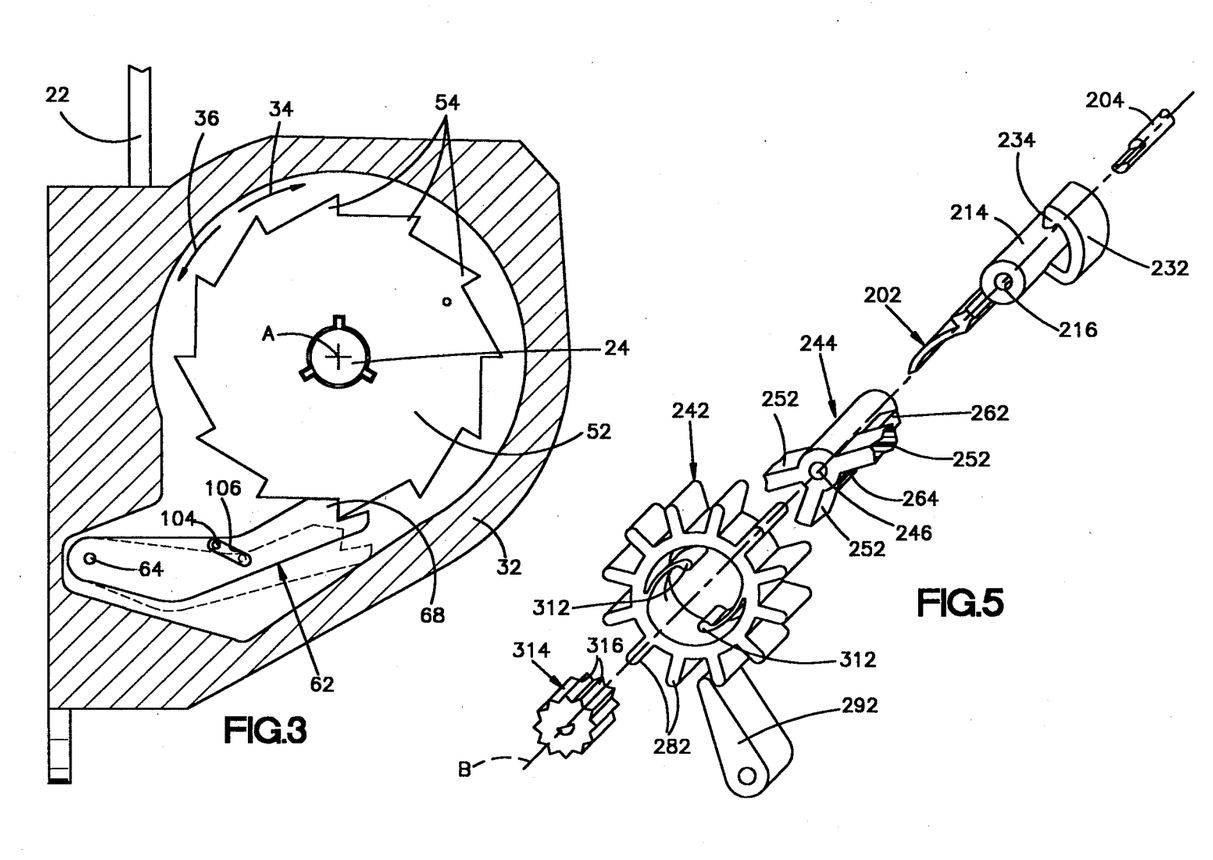
FIG. 3 is a sectional view of the retractor of FIG. 2 taken approximately along line 3—3 in FIG. 2.
FIG. 5 is an exploded perspective view of a portion of the retractor of FIG. 1.
Figure 6:
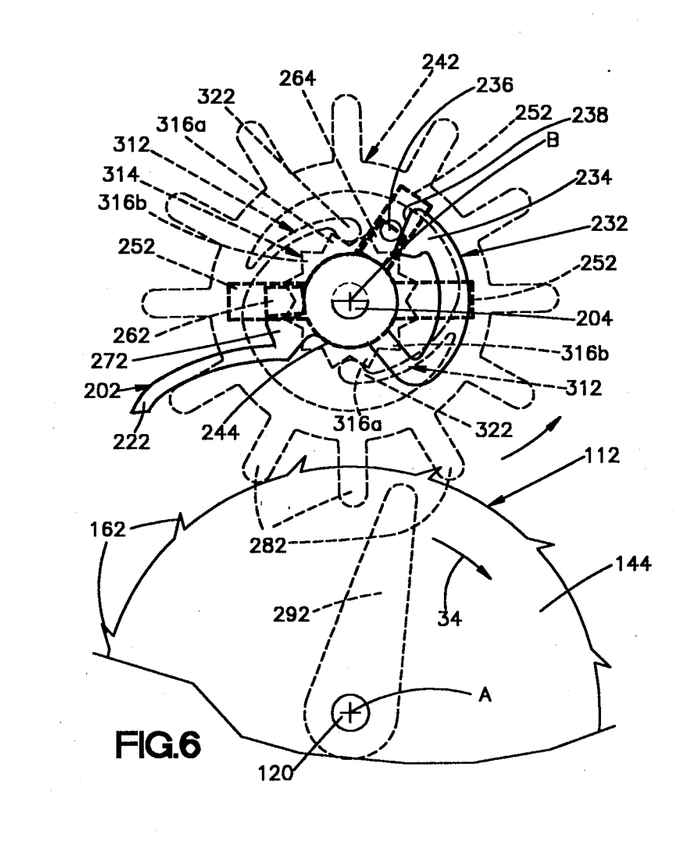
FIGS. 6—9 are enlarged views of a portion of the retractor of FIG. 1 with parts in different positions.

A resiliently deflectable arm 202 (FIGS. 2, 4, 5 and 6) is supported for pivotal movement by a shaft 204 extending from the housing 76 in a direction parallel to the longitudinal central axis A of the spindle 24. The shaft 204 has a longitudinal central axis B (FIGS. 5 and 6). A cylindrical body portion 214 (FIGS. 2 and 5) extends from the arm 202 in a direction perpendicular to the arm. A bore 216 extends coaxially through the cylindrical body portion 214. The bore 216 of the cylindrical body portion 214 receives the shaft 204 to support the arm 202 for pivotal movement toward and away from the inertia member 112.

An end portion 222 of the arm 202 is engageable with one of the plurality of teeth 162 on the clutch disk 144 of the inertia member 112. When the end portion 222 of the arm 202 engages one of the teeth 162 on the clutch disk 144, rotation of the inertia member 112 is blocked, thereby enabling the spindle 24 to rotate in the belt withdrawal direction 34 relative to the inertia member 112. Upon a predetermined amount of rotation of the spindle 24 relative to the inertia member 112 in the belt withdrawal direction 34, as described above, the pawl 62 is forced to pivot toward the ratchet wheel 52 to block further withdrawal of the belt webbing 22 from the retractor 20.

A resiliently deflectable detaining spring 232 is molded in one piece with the cylindrical body portion 214. The detaining spring 232 has an end portion 234 which deflects over a projection 236 extending from the housing 76 in a direction parallel to the shaft 204. The end portion 234 of the detaining spring 232 maintains the arm 202 in a position disengaged from the inertia member 112 when the end surface 238 of the end portion 234 engages the projection 236, as illustrated in FIG. 6. When the arm 202 pivots toward the clutch disk 144, the end portion 234 of the detaining spring 232 deflects over the projection 236 and maintains the arm in a position engaging the inertia member, as illustrated in FIG. 7, so vehicle vibrations do not disengage the arm from the clutch disk.

A rotatable member 242 (FIGS. 2, 4, 5 and 6) is supported for rotation on the shaft 204. A cylindrical body portion 244 is molded in one piece with and extends coaxially from the rotatable member 242, although the body portion 244 is shown as broken away from the rotatable member in FIG. 5 for clarity. A bore 246 extends coaxially through the cylindrical body portion 244. Another portion of the shaft 204 extends through the bore 246 in the cylindrical body portion 244. The cylindrical body portion 244 of the rotatable member 242 is located on the shaft 204 axially adjacent to the cylindrical body portion 214 of the arm 202, as viewed in FIG. 2.

Three connecting arms 252 (FIG. 5) extend radially from the cylindrical body portion 244 and connect the rotatable member 242 to the cylindrical body portion 244. A pair of drive legs 262, 264 are also connected to and extend radially from the cylindrical body portion 244. The drive legs 262, 264 are not located at diametrically opposite locations on the body portion 244. When the cylindrical body portion 244 is received on the shaft 204, the arm 202 is located in the larger of the two circumferential spaces defined between the drive legs 262, 264, as illustrated in FIG. 6. The drive legs 262, 264 engage the arm 202 upon a predetermined amount of rotation of the rotatable member 242 to pivot the arm in a direction either toward or away from the inertia member 112 depending upon the direction of rotation of the rotatable member.

Figure 7:
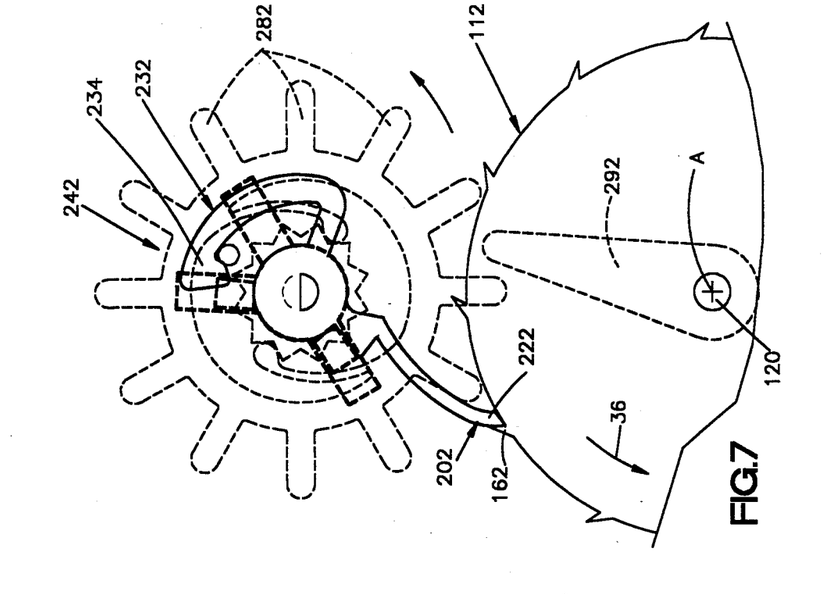

For example, if the rotatable member 242 rotates counterclockwise, as viewed in FIG. 6, the drive leg 262 engages an upper surface of a base portion 272 of the arm 202 and pivots the arm counterclockwise about the axis B toward the inertia member 112 to the position illustrated in FIG. 7, in which the arm 202 engages one of the teeth 162 on the clutch disk 144 of the inertia member 112. When the rotatable member 242 rotates in a clockwise direction, as viewed in FIG. 8, the drive leg 264 engages a lower surface of the base portion 272 of the arm 202 and pivots the end portion 222 of the arm clockwise from the position illustrated in FIG. 8 to the position illustrated in FIG. 9. The end portion 222 no longer engages the inertia member 112 and, thus, the inertia member may rotate with the spindle 24 in the belt withdrawal direction 34.

Twelve drive teeth 282 (FIGS. 5, 6, 7, 8, 9) extend radially from and are equally spaced about the rotatable member 242. A drive arm 292 is connected to the spindle 24 through the shaft 120 and is rotatable with the spindle about the axis A. During each revolution of the spindle 24, the drive arm 292 revolves once and engages one of the plurality of drive teeth 282 on the rotatable member 242 to rotate the rotatable member about the axis B of the shaft 204. Thus, each revolution of the spindle 24 and drive arm 292 corresponds to 30° of 1/12 of a revolution of the rotatable member 242. While there are twelve drive teeth 282 illustrated on the rotatable member 242 in the preferred embodiment, it will be apparent that any number of drive teeth may be used. It will also be apparent that if the number of drive teeth 282 on the rotatable member 242 is changed, the amount of angular displacement of the rotatable member during each revolution of the spindle 24 and drive member 292 will increase or decrease.

A pair of resiliently deflectable detent springs 312 (FIG. 6) extend radially inwardly from the rotatable member 242. A detent wheel 314 is fixed to the end portion of the shaft 204. The detent wheel 314 has a plurality of teeth 316, the number of which corresponds to the number of drive teeth 282 on the rotatable member 242. During each incremental rotation of the rotatable member 242 in the counterclockwise direction, for example, end portions 322 of the detent springs 312 are forced over the crest of a tooth 316a and into the root located between the tooth 316a and the next adjacent tooth 316b. The detent springs 312, thus, limit the amount of rotation of the rotatable member to a predetermined arcuate distance, namely 30° in the preferred embodiment, during each revolution of the spindle 24 and drive arm 292.

The rotatable member 242 will rotate approximately 30°, from the position illustrated in FIG. 6 to the position illustrated in FIG. 7, during one revolution of the spindle 24 and drive arm 292 in the belt withdrawal direction 34. During this last 30° of rotation of the rotatable member 242 to the position illustrated in FIG. 7, the drive leg 262 engages the base portion 272 of the arm 202 and pivots the end portion 222 of the arm toward the inertia member 112 to block rotation of the inertia member.

The spindle 24 and drive member 292 make a predetermined number of revolutions, in proportion to a predetermined amount of withdrawal of belt webbing 22, to rotate the rotatable member 242 a predetermined amount to pivot the arm 202 to engage the inertia member 112. The predetermined amount of rotation of the rotatable member 242 which is required to pivot the arm 202 to a position engaging the inertia member 112 is a function of the predetermined amount of withdrawal of the belt webbing 22 from the retractor 20. Thus, upon the predetermined amount of withdrawal of the belt webbing 22, rotation of the inertia member 112 in the belt withdrawal direction 34 is blocked. Thereafter, a slight additional amount of withdrawal of the belt webbing 22 from the retractor 20 causes the pawl 62 to pivot toward the ratchet wheel 52 to block further withdrawal of the belt webbing 22. After the belt webbing 22 is withdrawn the predetermined amount, the belt webbing may be retracted due to the bias of the wind-up spring 38 even though further withdrawal of the belt webbing 22 from the retractor 20 is blocked.

It will be apparent that any number of revolutions of the spindle 24 and drive member 292 may be chosen to bring the arm 202 into engagement with the inertia member 112 by changing the initial position of the rotatable member 242. For example, changing the angular starting position of the rotatable member 242 in a clockwise direction 60° from the position illustrated in FIG. 6 would require 60° more angular displacement of the rotatable member 242 before the end portion 222 of the arm engages the inertia member 112. The additional 60° of displacement corresponds to two additional revolutions of the spindle 24 and drive arm 292.

Figure 8:
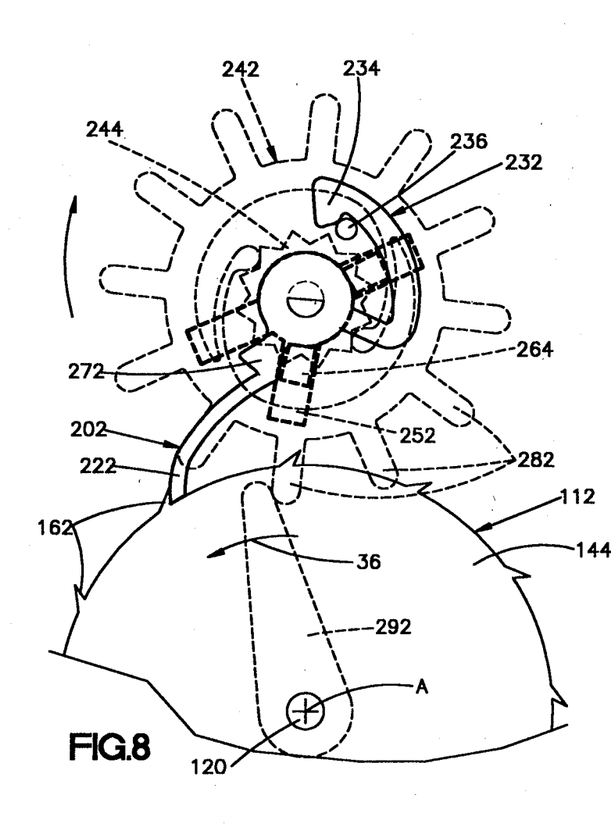
Figure 9:
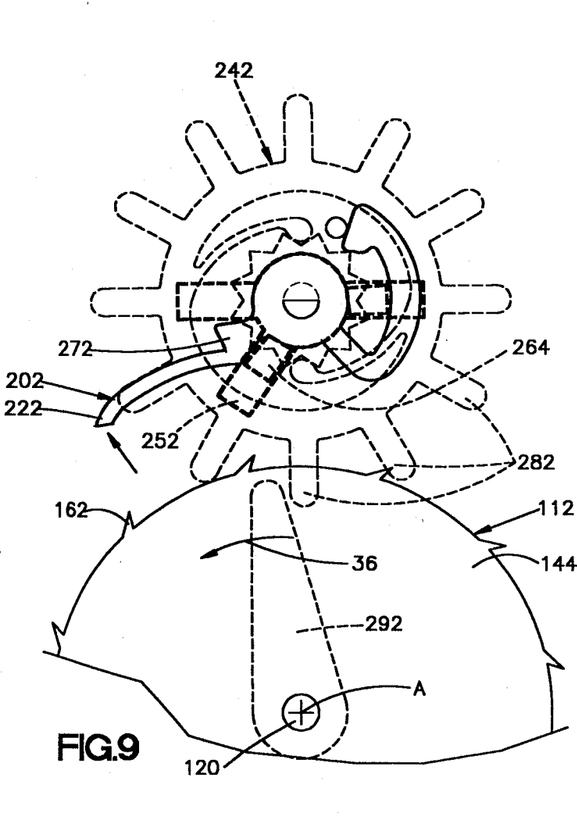

The arm 202 pivots clockwise from the position illustrated in FIG. 7 to the position illustrated in FIG. 9 during rotation of the rotatable member 242 another predetermined amount in the belt retraction direction 36. In the preferred embodiment, when the rotatable member 242 rotates 180° in the belt retraction direction 36 from the position in FIG. 7, the drive leg 264 engages the arm 202, as illustrated in FIG. 8. Upon further rotation of the rotatable member 242, the drive leg 264 pivots the arm 202 in a direction away from the inertia member 112 until the end portion 222 of the arm 202 is disengaged from the tooth 162 on clutch disk 144 as illustrated in FIG. 9, thereby allowing rotation of the inertia member 112 in either direction about the axis A.

From the above description of a preferred embodiment of the invention, those skilled in the art will perceive improvements, changes and modifications. Such improvements, changes and modifications within the skill of the art are intended to be covered by the appended claims.

Having described a specific preferred embodiment of the invention, I claim:

1. An apparatus comprising:
    a spindle having belt webbing wound thereon, said spindle being supported for rotating in belt withdrawal and belt retraction directions;
    spindle rotation blocking means including a pivotally mounted pawl member movable from a first position allowing rotation of said spindle in the belt withdrawal direction to a second position blocking rotation of said spindle in the belt withdrawal direction;
    an inertia member supported for rotation with and relative to said spindle, said inertia member having a plurality of teeth extending from said inertia member;
    means for pivotally moving said pawl member to its second position in response to rotation of said spindle in the belt withdrawal direction relative to said inertia member; and
    means for blocking rotation of said inertia member in response to rotation of said spindle a predetermined amount in the belt withdrawal direction to thereby enable said spindle to rotate in the belt withdrawal direction relative to said inertia member to thereby effect pivotal movement of said pawl member to its second position, said means for blocking rotation including:
    a rotatable member;
    means for intermittently rotating said rotatable member upon rotation of said spindle in the belt withdrawal direction including a drive arm connected to and rotatable with said spindle and continuously rotating in the belt withdrawal direction during belt withdrawal, said drive arm intermittently rotating said rotatable member in a first direction of rotation upon rotation of said drive arm in the belt withdrawal direction; and
    a blocking arm supported for pivotal movement and having a portion for engaging one of a plurality of teeth on said inertia member to block rotation of said inertia member, said blocking arm portion being pivotable toward said inertia member to engage one of said plurality of teeth on said inertia member in response to rotation of said rotatable member by a predetermined amount in said first direction of rotation.

2. Apparatus as defined in claim 1 wherein said drive arm engages said rotatable member intermittently during continuous rotation of said drive arm, said rotatable member rotating upon engagement by said drive arm.

3. Apparatus as defined in claim 2 comprising detent means for blocking rotation of said rotatable member when said rotatable member is not being rotated by said drive arm during continuous rotation of said drive arm.

4. Apparatus as defined in claim 3 wherein said detent means comprises means for limiting rotation of said rotatable member to a predetermined arcuate distance upon engagement of said rotatable member by said drive arm, said arcuate distance being less than said predetermined amount of rotation of said rotatable member, and for blocking rotation of said rotatable member when said rotatable member is not being rotated by said drive arm.

5. Apparatus as defined in claim 2 wherein said rotatable member comprises an index wheel having a plurality of drive teeth extending radially outwardly from said index wheel, said drive arm engaging one of said plurality of drive teeth to rotate said rotatable member by a predetermined arcuate distance.

6. Apparatus as defined in claim 1 comprising means for maintaining said blocking arm portion out of engagement with said teeth on said inertia member until said rotatable member has rotated by said predetermined amount in said first direction of rotation, and means for maintaining said blocking arm portion in engagement with one of said plurality of teeth on said inertia member after said rotatable member has rotated by said predetermined amount in said first direction of rotation.

7. Apparatus as defined in claim 6 comprising means for moving said blocking arm portion out of engagement with said inertia member upon rotation of said rotatable member in a second opposite direction of rotation by said predetermined amount.

8. An apparatus as defined in claim 1 wherein said inertia member comprises an inertia disk and a clutch disk coaxial with said inertia disk, said clutch disk being normally rotatable with said inertia disk and being rotatable relative to said inertia disk through a relatively small arcuate distance, said plurality of teeth on said inertia member extending from said clutch disk, said means for blocking rotation of said inertia member comprising means for blocking rotation of said clutch disk relative to said inertia disk to thereby allow said inertia disk to rotate relative to said clutch disk through said relatively small arcuate distance to effect pivotal movement of said pawl member to its second position.

9. An apparatus as defined in claim 1 wherein said spindle blocking means includes a ratchet wheel connected to said spindle and rotatable with said spindle and having a plurality of ratchet teeth extending therefrom, said pawl member being supported for pivotal movement into engagement with one of said ratchet teeth on said ratchet wheel.

10. An apparatus as set forth in claim 1 for use in a vehicle and further including means for blocking rotation of said inertia member in the belt withdrawal direction in response to deceleration of the vehicle at a rate above a predetermined rate of deceleration to enable said spindle to rotate in the belt withdrawal direction relative to said inertia member.

11. An apparatus as defined in claim 1 wherein said rotatable member has an axis of rotation spaced apart from and extending parallel to the axis of rotation of said spindle.

* * * * *